May 27, 1930. W. V. LUDLAM 1,760,705
AIR CLEANER OR FILTER FOR CARBURETORS
Filed Nov. 9, 1926 2 Sheets-Sheet 1
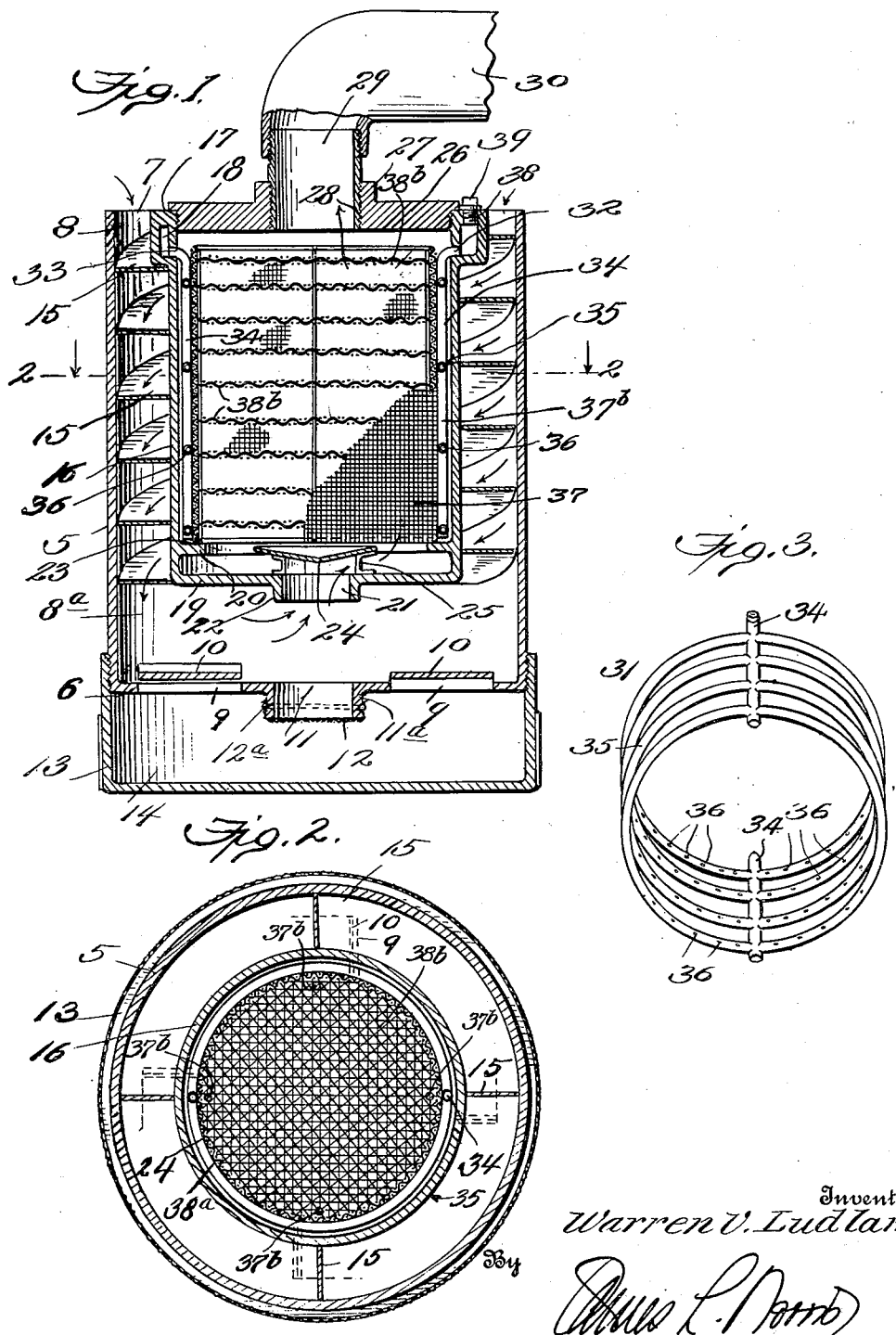
Inventor
Warren V. Ludlam
By
Attorney May 27, 1930. W. V. LUDLAM 1,760,705
AIR CLEANER OR FILTER FOR CARBURETORS
Filed Nov. 9, 1926 2 Sheets-Sheet 2
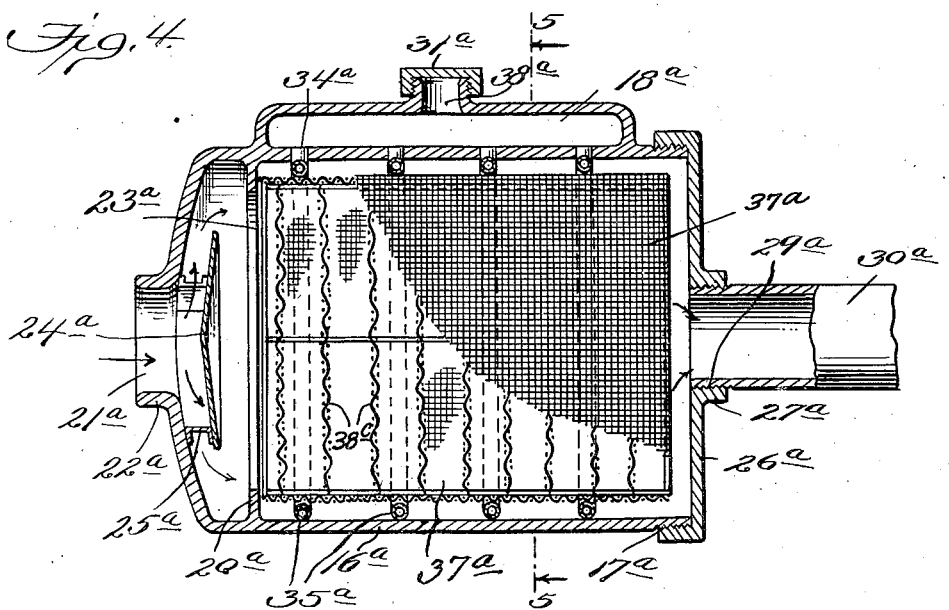
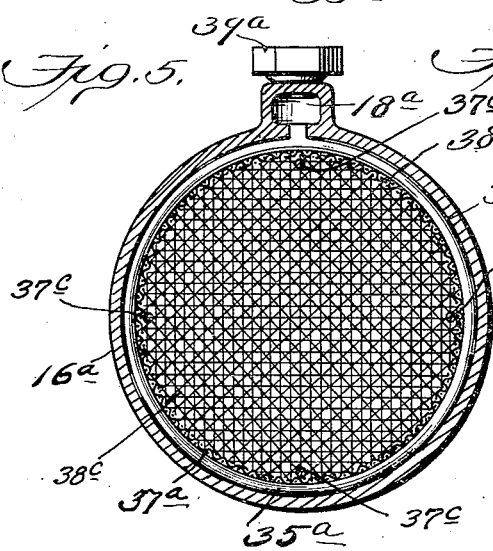
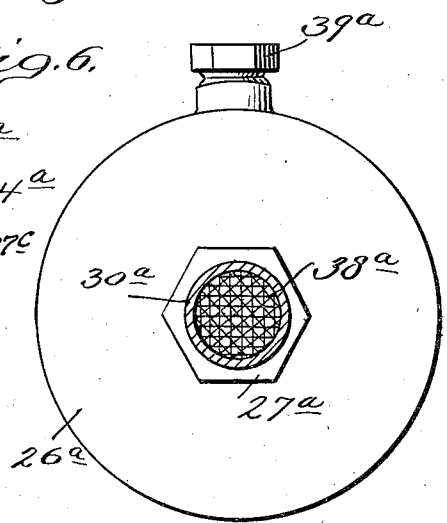
Inventor
Warren V. Ludlam
By
Attorney Patented May 27, 1930

1,760,705

UNITED STATES PATENT OFFICE

WARREN V. LUDLAM, OF MERIDIAN, MISSISSIPPI

AIR CLEANER OR FILTER FOR CARBURETORS

Application filed November 9, 1926. Serial No. 147,303.

This invention relates to an air cleaner or filter particularly adapted for application to an internal combustion engine and specifically to the carburetor, and whereby the air is purified and relieved of dirt and dust to such an extent as to render the carburetor more effective in its operation, with material advantages to the operation of the motor to which the combustible mixture, including the cleaned air, is fed.

The primary object of the invention is to provide an air cleaner or filter which may be readily applied in operative position to any form of carburetor for an internal combustion engine and embodying therein means for practically eliminating particles of coarse and finer dust from the atmospheric air supplied to the carburetor, and also to render the parts of the improved cleaner or filter easily accessible and removable for cleaning the same, and thus maintain the cleaner or filter in a superior serviceable condition.

The improved cleaner or filter operates somewhat on the principle of a dust collector, by first taking up and liberating and separating from the incoming air the coarser particles of dust and dirt and then subjecting the air to further treatment to remove the finer particles of dust and dirt by a novel construction and arrangement of parts which will be more fully hereinafter described and claimed.

In the drawings:

Figure 1 is a transverse vertical section of an air cleaner or filter embodying the features of the invention;

Figure 2 is a horizontal section on the line 2—2, Figure 1;

Figure 3 is a detail perspective view of an inner tubular oil distributing coil embodied in the improved structure;

Figure 4 is a longitudinal vertical section of a modified form of the improved air cleaner comprising the same essential features as shown by Figs. 1, 2 and 3 with a simplified formation of the parts;

Figure 5 is a transverse section on the line 5—5, Fig. 4; and

Figure 6 is a transverse section through one end of the modified form of the air cleaner particularly showing the connecting means therefor and the remaining parts in end elevation.

Referring to the form of the cleaner and filter shown by Figs. 1, 2 and 3, the numeral 5 designates an outer enclosing casing having a bottom 6 and having its opposite end 7 open. A cylinder 16 is mounted within the casing 5 concentrically with said casing and forms with the latter an annular passage 8 which communicates at its lower end with a chamber $8^a$ of suitable dimensions above the bottom 6. The bottom 6 has a plurality of outlet openings or slots 9 formed therein and arranged at diametrically opposite points and covered by upwardly bent or flaring deflector members 10, which are provided by suitably shaping the metal cut from the bottom 6 in the formation of the openings or slots 9. The bottom 6 also has a central opening 11 surrounded by a depending flange $11^a$ which is provided with a suitable fabric cover or strainer 12, removably held in place by a suitable fastening $12^a$, this cover forming a guard or strainer for the passage of air relieved of dust or dirt upwardly through the bottom 6 at this point. Removably secured to the bottom 6 is a supplemental bottom or cap 13 forming a settling chamber 14, which is rendered accessible for cleaning purposes by removing said supplemental bottom or cap 13. The annular inlet passage 8 is traversed by a spiral screw blade 15 which closely surrounds the enclosed cylinder 16. The cylinder 16 has its upper end open and is interiorly screw-threaded, as at 17, and diametrically enlarged and surrounded by an annular oil chamber 18. The cylinder 16 has a bottom 19 and an internal flange 20 spaced a distance above said bottom. The bottom 19 has a central inlet opening 21 surrounded by a collar 22, and the internal diameter of the opening 23 formed by the flange 20 is greater than that of the opening 21 in the bottom 19. Over the opening 21 and between the latter and the flange 20 is an inverted conical deflector 24, which is supported by a suitable bracket 25 secured on the upper side of the bottom 19 over the said opening 21. This deflector 24 causes the air currents passing through the opening 21 to be deflected laterally towards and to pass upwardly through the opening 23 of the member 20. The cylinder 16 is of materially less diameter than the casing 5, as will be readily understood, and is held in fixed position, the spiral blade 15 surrounding said cylinder and being secured thereto as well as to the inner side of the wall of the outer casing 5. The cylinder 16 is of less length than the outer casing 5 so that its bottom 19 is spaced from the bottom of the casing 5. In the upper screw-threaded portion of the enlarged end of the cylinder 16 a cover plate 26 is removably mounted and has a collar 27 around an outlet opening 28, which is interiorly screwthreaded to receive a tubular coupling 29 to which is attached a pipe or similar tubular conveying means 30, adapted to be attached to the carburetor. The cover plate 26 is easily removable and is constructed to closely fit and form a tight joint with the upper end of the cylinder 16 when applied in operative position. The oil chamber 18 surrounding the upper end of the cylinder 16 may be filled with oil through a screw-threaded opening 38 closed by a removable plug 39.

Within the cylinder 16 is an oil delivery member 31 formed of a plurality of circular pipes spaced apart in parallel relation and connected by pipes 34 which extend longitudinally of the cylinder 16 and are connected at their terminals as at 32 and 33 to the oil chamber 18. The pipes 34 serve to supply the pipes 35 with oil from the said chamber 18. The pipes 35 have a series of perforations 36 in their inner peripheries from which the oil is fed and passes to an inner cylindrical textile fabric feeder 37 and thoroughly saturates the latter. The fabric member 37 is mounted between the inner peripheries of the pipes 35 and a cylindrical frame 37$^b$ and with said frame forms a receiver for oil coming from the oil chamber 18 through the pipes 34 and 35 and the perforations 36 in the latter pipes. A plurality of filaments 38$^b$, preferably of hair or bristles, extend transversely of the cylinder 37. The filaments 38$^b$ are preferably arranged in suitable spaced layers and cross at angles to each other, and over these filaments the oil is fed by capillarity from the fabric receiver 37. Thus a reliable dust-collecting means is provided. The diameter of the receiver 37 is greater than the opening 23 through the flange 20 at the lower end of the cylinder 16 and both ends of said receiver are open so that the air will be drawn by the suction of the engine through the opening 21 and then through the lower end of said receiver and between the filaments 38$^b$ and the dust carried by the air will be deposited on said filaments. Thus clean air will be delivered to the carburetor for mixture with the fuel.

The form of the cleaner shown by Figs. 4, 5 and 6 is essentially the same as that shown by Figs. 1, 2 and 3, and in this instance the casing 16$^a$ is disposed horizontally, instead of vertically as in Fig. 1, and has at one end a central opening 21$^a$ surrounded by a collar 22$^a$ and a deflector 24$^a$ is supported by a suitable bracket 25$^a$ at the inner side of said opening 21$^a$ in the same manner as heretofore described in connection with the device shown by Fig. 1. Within the enclosing casing 16$^a$ is an annular flange 20$^a$ having a central opening 23$^a$ of larger diameter than the opening 21$^a$ and the opposite end of the casing 16$^a$ is closed by a removable cap 26$^a$ which is tightly secured when applied by a screw-threaded joint as at 17$^a$. The cap 26$^a$ has a central opening 29$^a$ which is surrounded by a collar 27$^a$, and to this collar a conveying or air feeding pipe 30$^a$ is connected and adapted to extend to the carburetor in the usual manner. On the upper portion of the casing 16$^a$ and exteriorly of the latter is an oil tank 18$^a$ having a filling opening 38$^a$ closed by a removable cap 39$^a$. The circular oil pipes 35$^a$ having perforations 36$^a$ on their inner peripheries are supplied with oil through pipes 34$^a$ extending radially from the pipes 35$^a$ and connected to the oil tank 18$^a$. The fabric member 37$^a$, wire frame 37$^c$, and filaments 38$^c$ are similar to the fabric member 37, wire frame 37$^b$ and filaments 38$^b$ shown in Figures 1 and 2.

Both constructions as heretofore described and shown in the drawings embody an enclosed removable oil receiver of textile fabric and carrying a plurality of filaments in crossed, spaced relation, the receiver being removable from the casing 16 or 16$^a$, as shown by Figures 1 and 4, by first unscrewing and removing the cap 26 or 26$^a$, whereby the said receiver and its filaments or bristles may be thoroughly cleaned and then reset within the air cleaner or filter. In the form of the device first described the screw or spiral blade 15 surrounding the inner cylinder or casing 16 causes the air to assume a gyratory motion so that, when it enters the chamber 8$^a$, the heavier particles of dirt will be thrown towards the bottom beneath the deflector members 10 and pass out through the openings 9 into the chamber 14, and the air which has been thus partially cleaned will pass through the cover 12 and opening 11 and upwardly through the chamber 8$^a$ into and through the opening 21 and then through the oil receiver with its filaments or bristles and out through the outlet 28 to the carburetor in a clean condition.

In the form of the cleaner shown by Figs. 4, 5 and 6 the air is directly admitted into the receiver 37$^a$ through the opening 21$^a$ without preliminary treatment to remove the heavier particles of dust and dirt as in the form shown by Figs. 1, 2 and 3, and passes through the said receiver and is relieved of dust and dirt and is then drawn onward to and through the carburetor in a clean condition.

It will be seen that in the essential final cleaning of the air the operation is the same in both forms of the device and that both include a removable receiver having filaments or bristles arranged at angles to one another in regular sequence and between which the air is caused to pass, the bristles or filaments carrying oil which by capillarity is fed thereto from the surrounding textile wall of the receiver.

It is proposed to apply the improved air cleaner or filter to any form of carburetor to which it may be adapted and to make such changes and modifications as fairly fall within the scope of the appended claims.

What is claimed as new is:

1. An air cleaner of the class specified, comprising an enclosing casing, an oil receptacle associated with said casing, a tubular fabric receiver in said casing and extending longitudinally thereof, said receiver being open at opposite ends and having filaments extending transversely thereof at angles to each other, and means surrounding the receiver and connected to the oil receptacle for supplying oil to the fabric receiver.

2. An air cleaner of the class specified, comprising an enclosing casing having an air inlet and an air outlet, a dust-catching receiver extending longitudinally of said casing, said receiver comprising an open-ended tubular member of textile material through which air passes longitudinally in its passage through said casing, said tubular member having filaments secured thereto and extending thereacross in spaced relation at angles to each other, and means for supplying oil to the tubular fabric member.

3. An air cleaner of the class specified, comprising a casing having means for admitting atmospheric dust-laden air thereto and an air outlet, a dust collecting tubular receiver of absorbent material in said casing through which the air is drawn longitudinally in its passage through said casing, the said receiver having filamentous members extending transversely thereof at intervals and at angles to each other and between which the air passes, and means surrounding part of the said receiver for supplying oil thereto, said receiver being removable from said casing for cleaning purposes.

4. An air cleaner of the class specified, consisting of an enclosing casing having an air inlet, the bottom of said casing having a central opening and openings around the said central opening, the latter openings having guards extending thereover and partially exposing the same, means forming a chamber in said casing above said bottom, a spiral air-current-directing means within the casing and having its opposite ends connected to said air inlet and to the chamber for causing the air to be delivered into the chamber in a spiral circulatory course, a dust collecting receiver extending longitudinally of the casing inside of the spiral means and comprising a tubular fabric body open at opposite ends and having filaments extending thereacross at angles to each other, and oil supply means surrounding part of the said receiver, the casing having means for delivery of air to a carburetor after its passage through said cleaning receiver.

5. An air cleaner of the class specified, consisting of an enclosing casing having an air inlet and having its bottom provided with a central opening and openings around the said central opening, the latter openings having guards extending thereover and partially exposing the same, means in said casing spaced from the latter and also forming a chamber with said bottom, a spiral air-current-directing means within said space for conveying air from said inlet to said chamber in a spiral circulatory course, a dust-collecting receiver within said means and comprising a hollow fabric body open at opposite ends with filaments extending thereacross at angles to each other, and oil supply means in part surrounding the said receiver, the casing having means for delivery of air to a carburetor after its passage through said receiver, and means below the bottom of the casing and forming a supplemental chamber.

6. In an air filter of the character described, the combination of a main casing having an air inlet and an air outlet, and annular oil dispenser mounted in the casing, a tubular fabric oil absorbed disposed within the dispenser to receive the oil therefrom, and filaments supported by and extending across the space within the absorbent fabric and through which the air must pass in its movement through the casing.

7. In an air filter of the character described, the combination of a main casing having an air inlet and an air outlet, an annular oil dispenser mounted in the casing, a tubular fabric oil absorbent disposed within the dispenser to receive the oil therefrom, and strands of hair supported by and extending across the space within the absorbent fabric and through which the air must pass in its movement through the casing.

8. In an air filter of the character described, the combination of a main casing having an air inlet and an air outlet, an oil reservoir in communication therewith, a frame of perforated tubing fitting in the casing, said frame being in communication with said reservoir and by means of which oil is distributed from the reservoir, a hollow fabric member of substantially the same shape as the frame disposed within the frame to receive the oil therefrom, and filaments carried by the fabric member and supported to span the interior space of the member throughout its length.

9. In an air filter of the character described, the combination of a main casing having an air inlet and an air outlet, an oil reservoir in communication therewith, a frame of perforated tubing fitting in the casing, said frame being in communication with said reservoir and by means of which oil is distributed from the reservoir, a hollow fabric member of substantially the same shape as the frame disposed within the frame to receive the oil therefrom, and strands of hair having their ends supported in the fabric member and disposed to span the space between the walls of the member.

10. An air cleaner of the class specified, comprising a casing having an air inlet at its upper end and openings through its bottom in different positions, an inner casing in said casing spaced from the latter and also forming a chamber with said bottom, said inner casing having a connection at one end for a carburetor, a spiral air-directing means within the space between said casings to direct the air from the inlet with a spiral movement into said chamber, means below the bottom of the first-named casing and forming a supplemental dirt-receiving chamber to receive the heavier particles of dust and dirt from said chamber through some of said openings, said inner casing having an oil tank at one extremity and communicating at its opposite extremity with said first-named casing, oil delivery means comprising a circular pipe within the inner casing connected to said oil tank, and a tubular fabric member closely fitted against and within the circle of the pipe and having a series of filaments extending thereacross at angles to each other and in spaced relation to receive oil therefrom, said filaments serving to collect dust and dirt from the air passing between them to said carburetor connection.

In testimony whereof I have hereunto set my hand.

WARREN V. LUDLAM.